United States Patent [19]
Cornford et al.

[11] 3,738,506
[45] June 12, 1973

[54] AUTOMATIC STORAGE SYSTEM

[76] Inventors: Arthur S. Cornford, 561 Bobolink Rd.; Charles S. Charron, 1607 Watersedge Road, both of Clarkson, Ontario, Canada

[22] Filed: May 6, 1971

[21] Appl. No.: 140,839

[30] Foreign Application Priority Data
Nov. 6, 1970 Great Britain... 52957/70

[52] U.S. Cl. .................... 214/16.4 C, 214/16.4 A
[51] Int. Cl. ............................................. B65g 1/06
[58] Field of Search ............... 214/16.4 R, 16.4 A, 214/16.4 B, 16.1 EB, 16.1 CB, 16.1 CC, 730, 16.1 A

[56] References Cited
UNITED STATES PATENTS

| | | | |
|---|---|---|---|
| 3,559,822 | 2/1971 | Lichtenford .................. | 214/16.4 A |
| 3,543,952 | 12/1970 | Young ........................... | 214/16.4 A |
| 3,531,705 | 9/1970 | Rosin et al. .................... | 214/16.4 A |
| 2,633,809 | 4/1953 | Robinson et al. .............. | 214/16.1 EB |
| 1,903,274 | 3/1933 | Watson ......................... | 214/16.1 CA |
| 1,824,201 | 9/1931 | Eisenberg ...................... | 214/16.4 A |
| 1,830,740 | 11/1931 | Leech et al. ................... | 214/38 BA |
| 2,763,381 | 9/1956 | Bowles.......................... | 214/16.1 EB |
| 3,389,814 | 6/1968 | Lemelson....................... | 214/16.4 A |

FOREIGN PATENTS OR APPLICATIONS

| | | | |
|---|---|---|---|
| 1,456,501 | 10/1969 | Germany ...................... | 214/16.4A |
| 382,975 | 12/1964 | Switzerland ................. | 214/16.1 CC |
| 233,472 | 5/1964 | Austria......................... | 214/16.1 CC |

Primary Examiner—Gerald M. Forlenza
Assistant Examiner—R. B. Johnson
Attorney—Maybee & Legris

[57] ABSTRACT

In a storage system of the kind comprising a racking structure which provides one or more storage sections, each storage section consisting of a honeycomb array of longitudinally extending storage cells the entrances to which are disposed in rows and columns and defining one side of an aisle from which access to the cells is gained for loading and/or unloading the cells, items are conveyed to and from selected cells by a conveyance mechanism comprising, for each aisle: a self-propelled main transporter adapted to run on tracks extending along the aisle, the main transporter being movable along the tracks to and from a selected column of cell entrances, or exits, an elevator carried by the main transporter, the elevator including an elevator platform which is movable to and from a selected cell entrance, or exit, of the selected column, a self-propelled satellite transporter for carrying an item to be stored, the satellite transporter being normally carried by the elevator platform and being adapted to run on tracks in the selected cell, and automatic means for controlling the movements of the satellite transporter to and from the elevator platform.

12 Claims, 15 Drawing Figures

INVENTORS
Arthur S. Cornford
Charles S. Charron
By Maybee & Legris
Attorneys

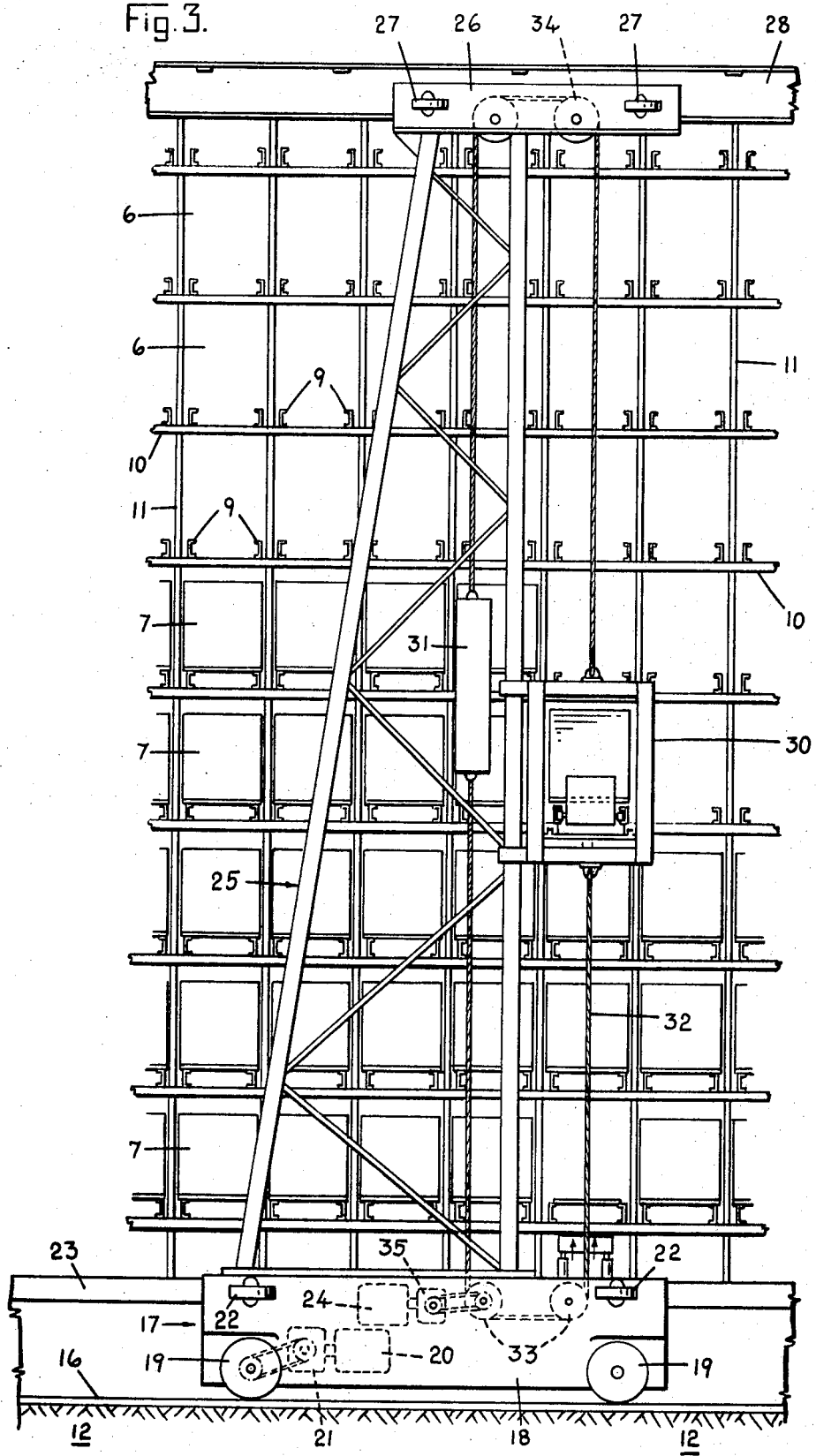

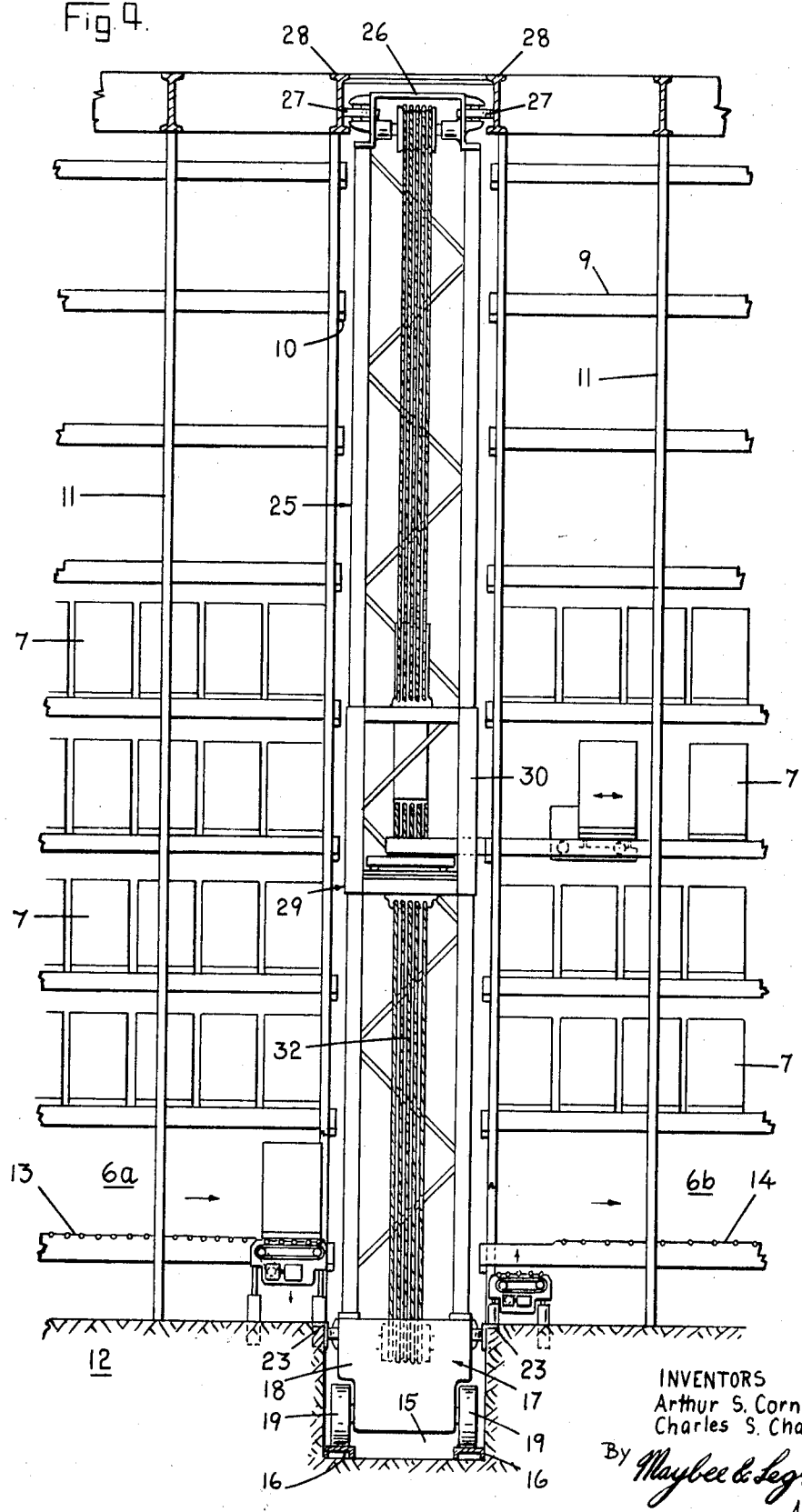

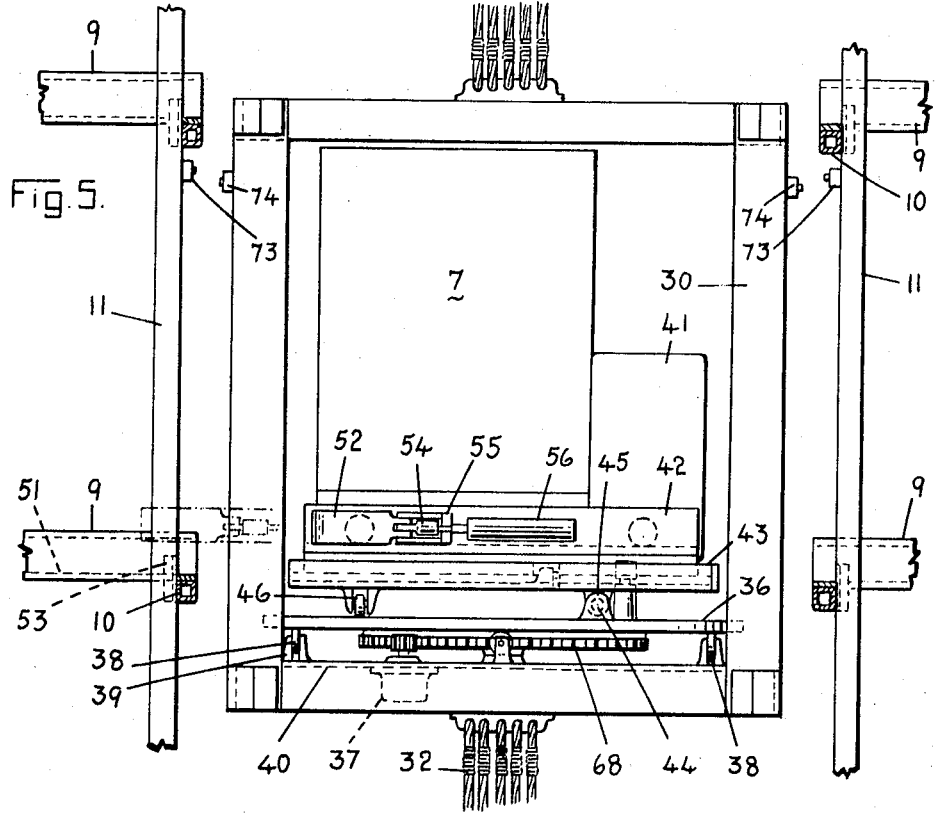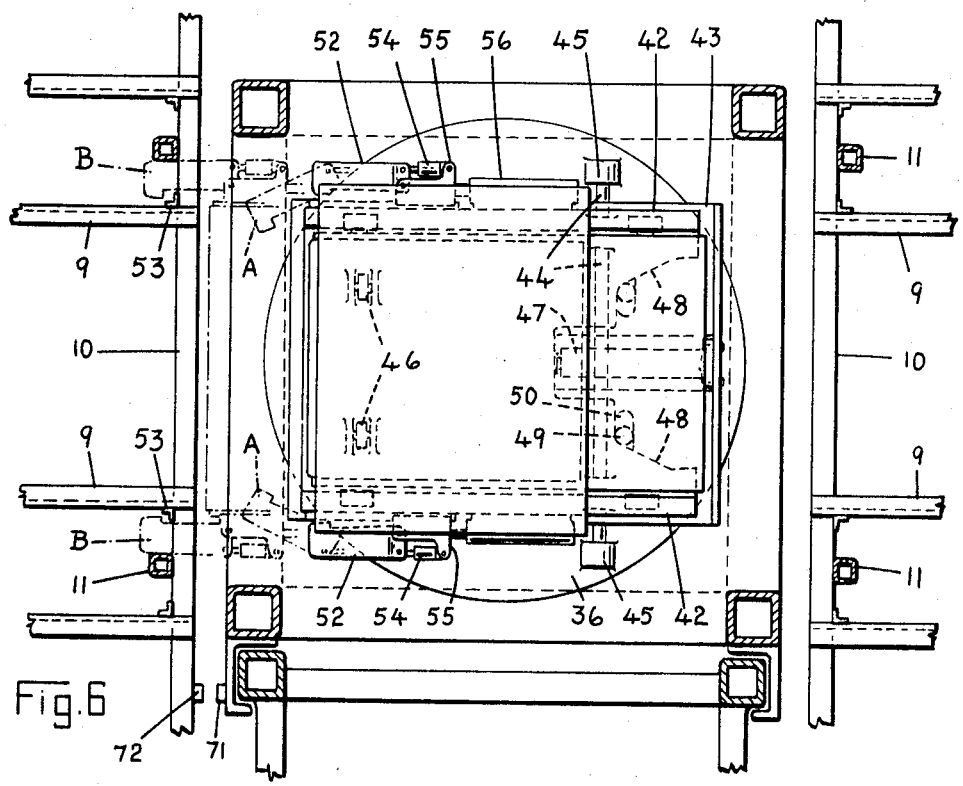

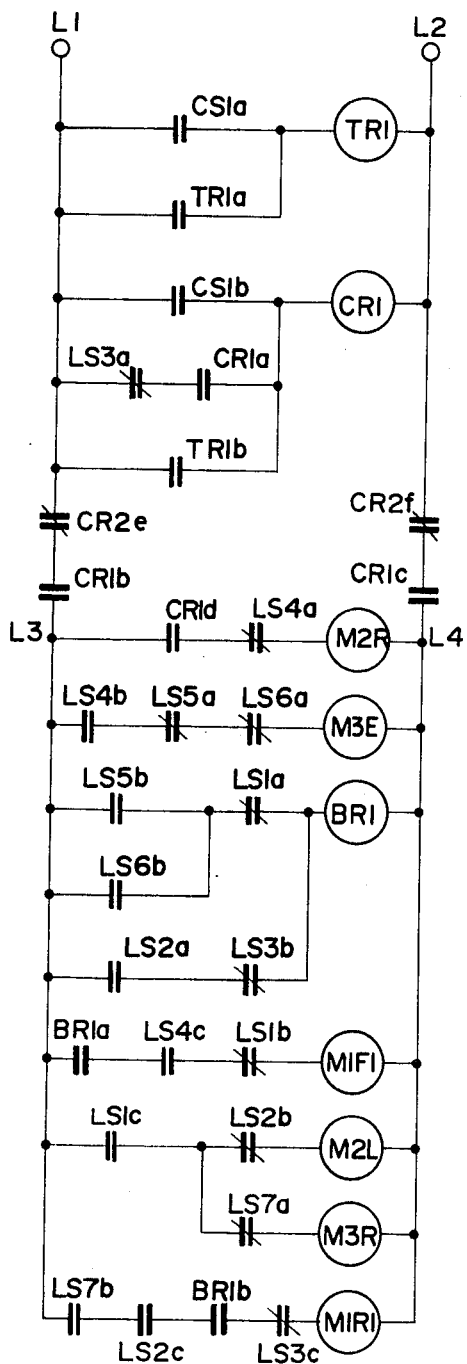
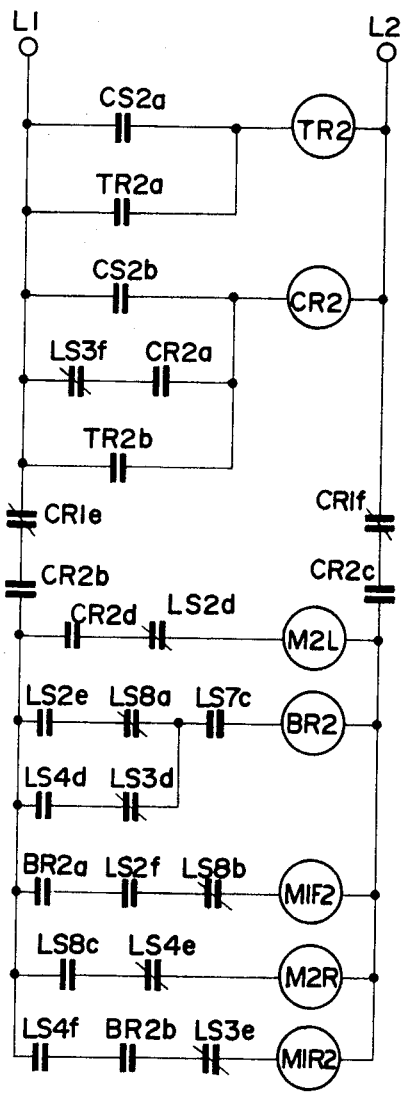
INVENTORS
Arthur S. Cornford
Charles S. Charron
By *Maybee & Legris*
Attorneys

AUTOMATIC STORAGE SYSTEM

BACKGROUND OF THE INVENTION

This invention relates to automatic and semi-automatic storage systems for the high density storage of bulky items. The invention is particularly concerned with storage systems of the kind comprising a racking structure which provides one or more storage sections, each storage section consisting of a honeycomb array of longitudinally extending storage cells the entrances to which are disposed in rows and columns and defining one side of an aisle from which access to the cells is gained for loading and/or unloading the cells.

Storage systems of this kind may be operated on a "first-in, first-out" basis, or on a "first-in, last-out" basis. In the former case it is necessary to provide access to the storage cells at opposite ends, and therefore it is necessary to locate each storage section between a pair of aisles which are used respectively for loading and unloading. In the latter case a single aisle may be used both for loading and unloading. In a large warehouse incorporating such a storage system it may be advantageous to include a number of aisles, which would extend transversely to the storage cells, some of the aisles, at least, being disposed between, and common to, two aligned storage sections. The storage sections in such a case may either be operated all on a "first-in, first-out", or a "first-in, last-out", basis; alternatively some of the storage sections may be operated on one basis and others on the other basis, according to the warehouse requirements.

The present invention is applicable generally to such systems, and is essentially concerned with the provision of mechanisms for the conveyance of items to and from selected storage cells.

SUMMARY OF THE INVENTION

According to the present invention, in a storage system of the kind referred to, items are conveyed to and from selected cells by a conveyance mechanism comprising, for each aisle: a self-propelled main transporter adapted to run on tracks extending along the aisle, the main transporter being movable along the tracks to and from a selected column of cell entrances, or exits, an elevator carried by the main transporter, the elevator including an elevator platform which is movable to and from a selected cell entrance, or exit, of the selected column, a self-propelled satellite transporter for carrying an item to be stored, the satellite transporter being normally carried by the elevator platform and being adapted to run on tracks in the selected cell, and automatic means for controlling the movements of the satellite transporter to and from the elevator platform.

While the satellite transporter must be controlled automatically the main transporter and elevator may either be controlled by an operator, or programmed to operate automatically.

In order that the invention may be more readily understood, one embodiment thereof will now be described in greater detail, by way of example, with reference to the accompanying drawings.

BRIEF DESCRIPTION OF THE DRAWINGS

FIG. 3 is a front elevational view of a main transporter positioned in one of the access aisles;

FIG. 4 is a side elevational view of the main transporter of FIG. 3, looking along the access aisle;

FIG. 5 is a side elevational view of an elevator platform and satellite transporter carried thereby;

FIG. 6 is a plan view of the elevator platform and satellite transporter carried thereby;

FIGS. 14 and 15 are schematic wiring diagrams of control devices carried by the satellite transporter.

DESCRIPTION OF THE PREFERRED EMBODIMENTS

Figure 1:
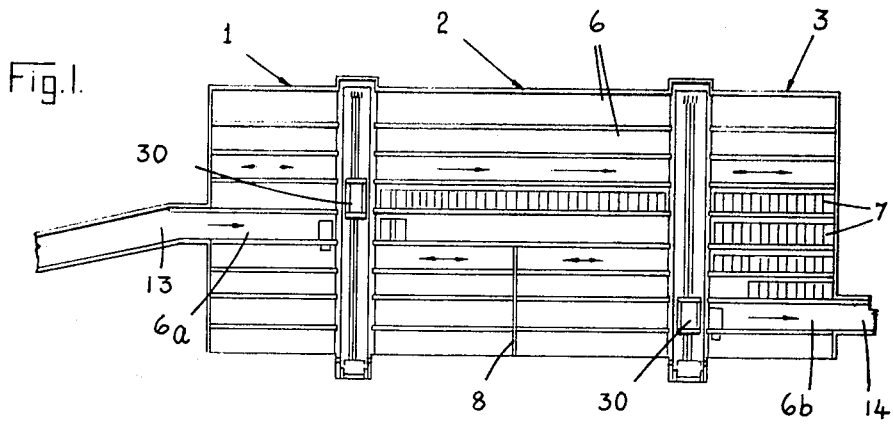
FIG. 1 is a vertical sectional view through a typical storage system according to the invention, the section being taken in a plane transverse to the access aisles.
Figure 2:
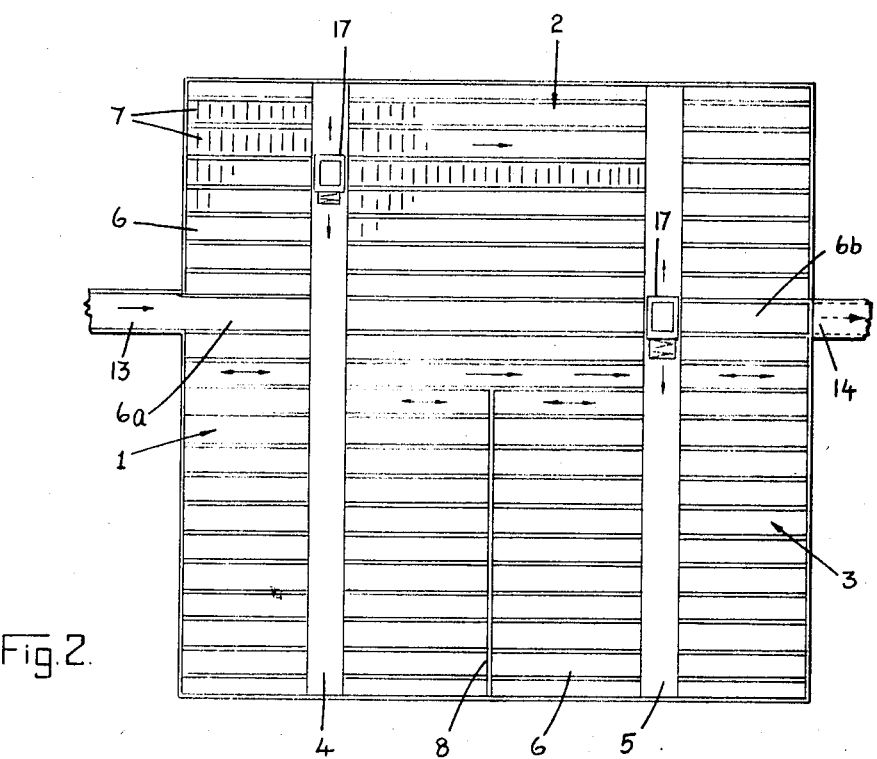
FIG. 2 is a sectional plan of the storage system.
Figure 7:
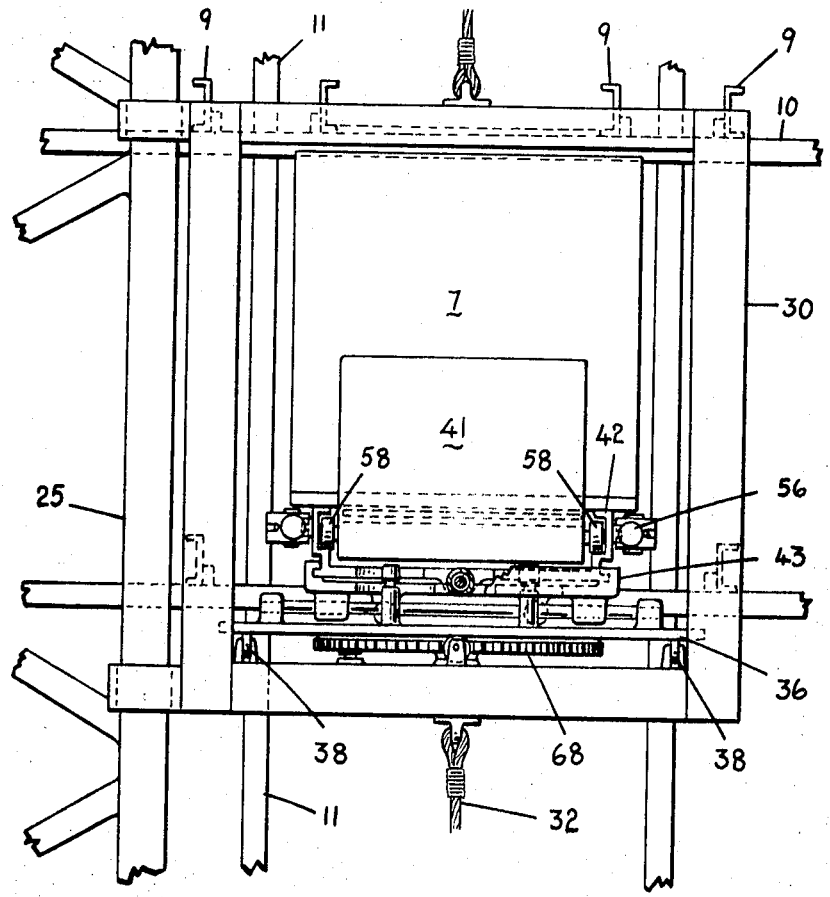
FIG. 7 is a front elevational view of the assembly shown in FIG. 5.

The storage system illustrated diagrammatically in FIGS. 1 and 2 comprises a steel racking structure providing three storage sections 1, 2, 3, separated by aisles 4, 5 extending for the full height and width of the racking structure. Each storage section comprises a honeycomb structure of individual storage cells 6 for the storage of crates 7, or the like. The cells extend longitudinally in each storage section, and the entrances to the cells are disposed in rows and columns providing a rectangular array and defining a vertical access face. As illustrated in FIG. 2, the storage sections 1 and 3, and half of the storage section 2 (in which half of the cells are partitioned by a transverse partition 8) are adapted to be used on a "first-in, last-out" basis, the cells of these sections each having just one entrance for loading and unloading. The other half of the storage section 2 is adapted to be used on a "first-in, first-out" basis, each cell having separate entrances for loading and unloading at its ends.

Each of the cells 6 has a pair of longitudinally extending C-sectioned beams 9 for supporting pallets, the beams 9 being carried by transverse members 10 connected to the uprights 11. The uprights 11 also support a roof (not shown) and the whole structure is mounted on a steel-reinforced concrete foundation 12 (FIG. 4). One cell 6a is positioned to receive incoming items conveyed along an inlet conveyor 13, and another cell 6b in alignment with the cell 6a but at a different level is positioned to receive items to be despatched from the storage system, an outlet conveyor 14 being positioned to receive the despatched items. It will be appreciated that the positioning of the cells 6a and 6b is in no way relevant to the internal working of the storage system but is chosen according to requirements in the external environment. There may be a number of such cells reserved to incoming items and items to be despatched.

In FIG. 4, the cells 6a and 6b for incoming and outgoing loads are shown at the same level, this being the lowest cell level of the storage system, and not as shown in FIG. 1. This modification is simply for the purpose of facilitating the description of the transfer units described later.

Extending along each of the aisles is a trench 15 formed in the concrete foundation 12, and a pair of rails 16 extending along the trench provide a track for a main transporter 17 (FIGS. 3 and 4). The transporter 17 comprises a chassis 18 mounted on four wheels 19 arranged to run on the rails 16. The wheels 19 are driven from an electric motor 20 through a transmission means 21. Electric current is supplied to the motor 20, and to a motor 24 for operating the elevator through slides (not shown). Rollers 22 at the sides of the chassis engage a pair of guide rails 23 for the purpose of steadying the transporter 17.

Mounted on the chassis 18 is a steel superstructure or tower 25, provided at its upper end with a structure 26 carrying wheels 27 which engage rigid guide rails 28 forming part of the racking structure for steadying the upper end of the tower. The main transporter 17 carries an elevator 29, comprising an elevator gate 30, a counterweight 31, and a cable 32; the cable passes round four pulley wheels, including a pair of pulley wheels 33 mounted on the chassis 18, and a pair of pulley wheels 34 mounted on the structure 26, one of the pulley wheels 33 being driven from the motor 24 through a transmission means 35.

The elevator cage 30 carries a turntable 36, which is driven from an electric motor 37 through a ring gear 68, the motor being energized from the same supply as the motors 20 and 24. The turntable 36 is mounted on four circumferentially spaced wheels 38 carried on trunnions 39 mounted on the elevator platform 40.

A satellite transporter 41, described more fully hereinafter, is normally mounted on track rails forming part of the elevator cage assembly and carried by a track frame 42. The track frame 42 is mounted on a support 43, which is pivotally connected to the turntable 36 by a horizontal shaft 44. The shaft 44 is supported by end journals 45 which are spaced from the track frame support 43 to permit a limited translational movement of the latter in either direction along the axis of the shaft. The track frame support 43 is further supported by a pair of castors 46 on its underside, these being spaced from the axis of the shaft and normally bearing upon the turntable.

Figure 9:
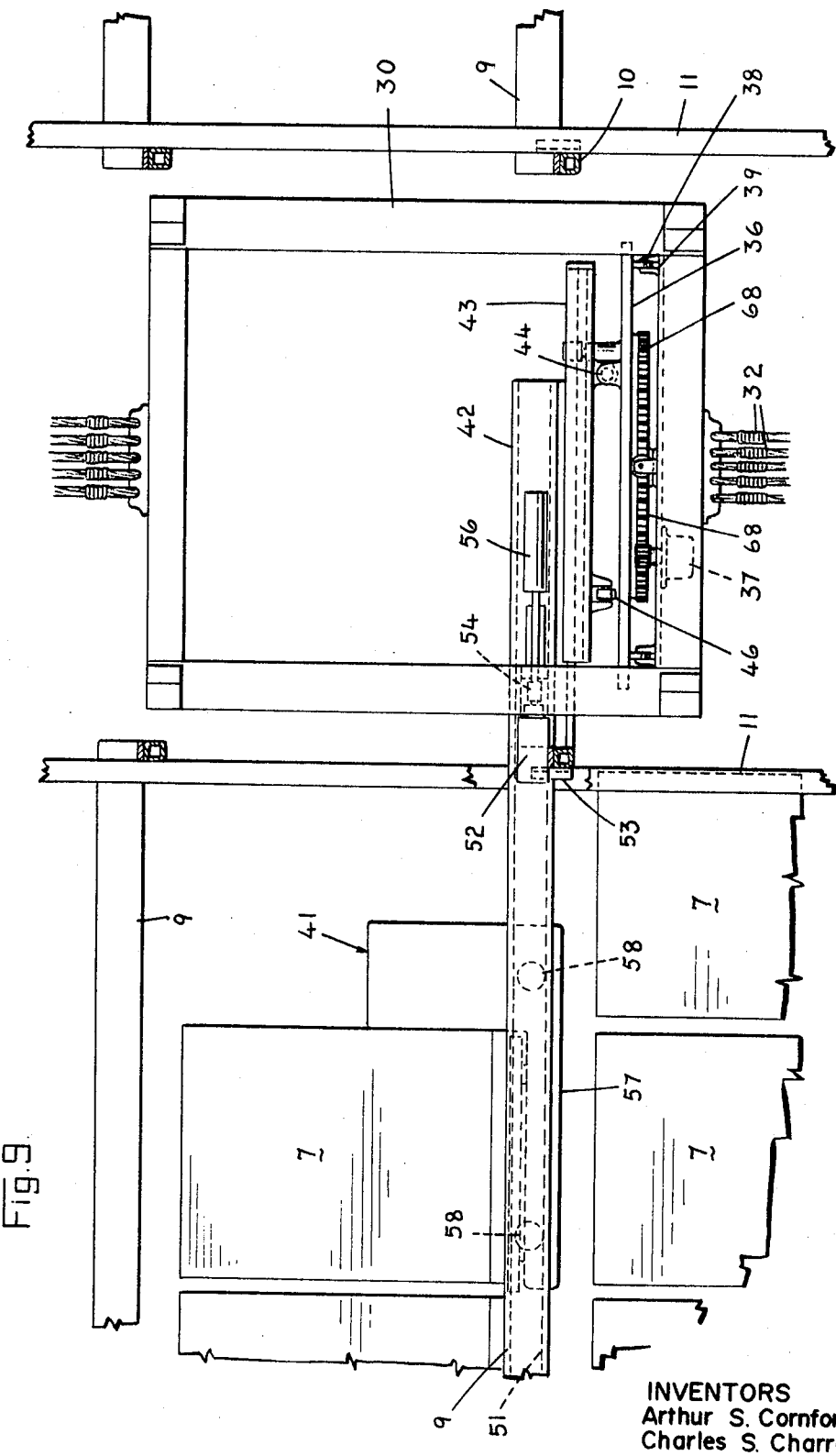
FIG. 9 illustrates in side elevation the manner of cooperation of the main transporter with a selected storage cell.
Figure 10:
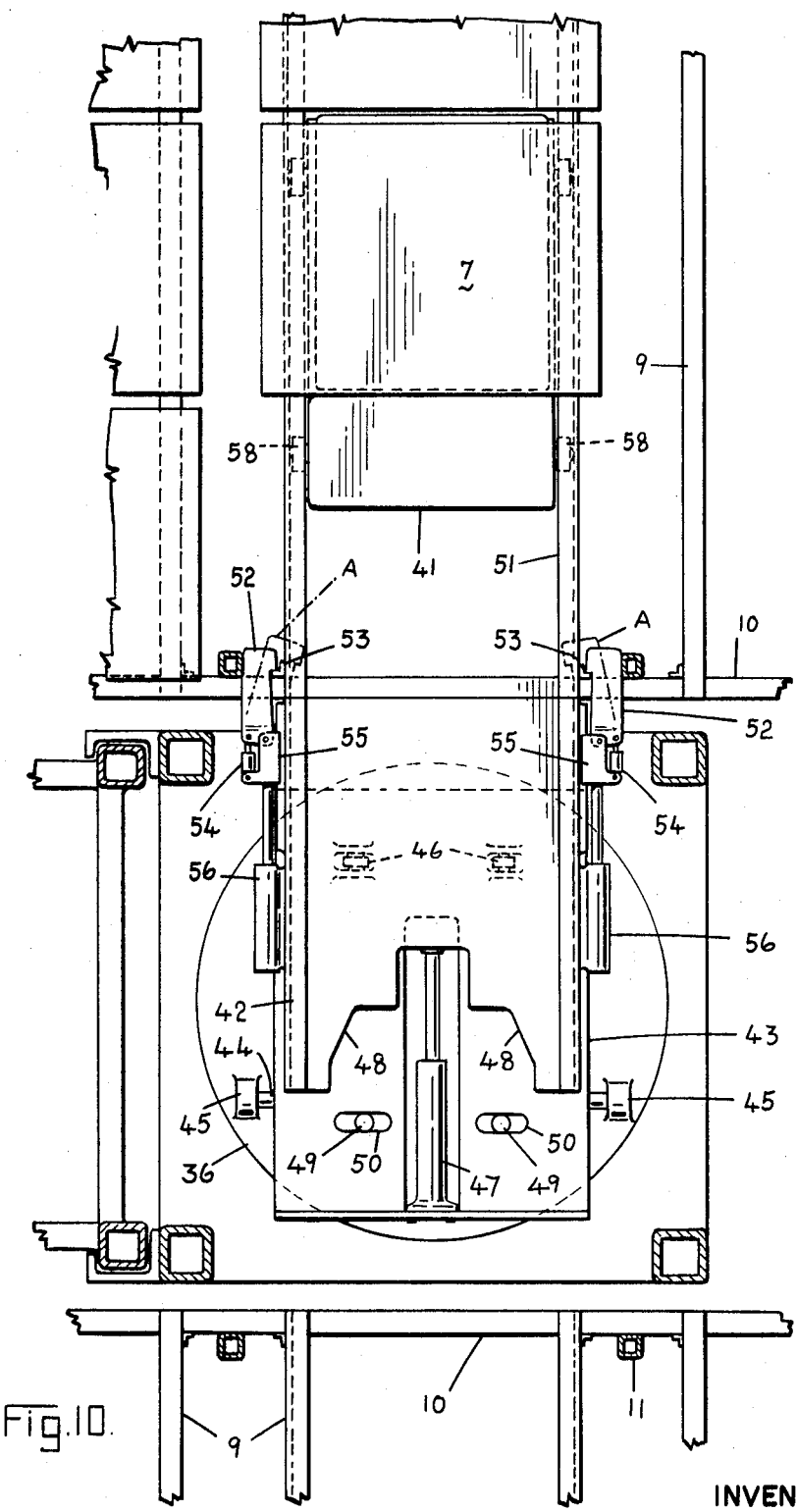
FIG. 10 is a plan view corresponding to the elevational view of FIG. 9.

The track frame 42 is extensible in a direction perpendicular to the shaft 44, as illustrated in FIGS. 9 and 10. The extension is achieved by means of a hydraulic ram actuator 47 mounted on the track frame support 43. As illustrated in FIG. 10, the rear portion of the track frame 42 is cut away to provide a pair of inclined edges 48 which, when the track frame is re-tracted, engage a pair of rollers 49 mounted on the turntable 36 and projecting through elongated holes 50 in the track frame support 43; the engagement of the rollers 49 with the edges 48 effects any necessary centralizing adjustment of the track frame 42 and track frame support 43 so as to ensure realignment of the track frame with the track rails 51 extending along the adjacent storage cell 6 and also to hold the track frame centrally and securely when the elevator is moving.

In order to ensure alignment of the track rails of the elevator cage assembly with the track rails 51 when the satellite transporter 41 is to be despatched from the cage assembly, a pair of pivoted latches 52 are provided for engaging a pair of latch abutments 53 mounted just inside the entrance of the cell 6. These latches are actuated by hydraulic ram actuators 54, and are pivotally mounted on a pair of extensible side rails 55, the latter being extended by a pair of ram actuators 56 mounted on the track frame support.

Figure 8:
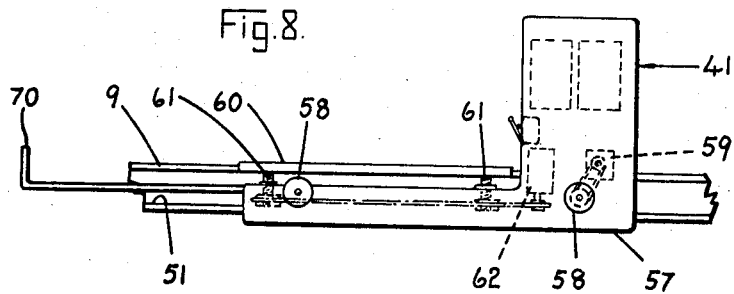
FIG. 8 is a side elevational view of a satellite transporter, the figure also showing a detail of a storage cell.

The satellite transporter 41 comprises a chassis 57 mounted on wheels 58 which run on the track rails of the elevator cage assembly and on the track rails 51 extending along the storage cell. The wheels 58 are driven from an electric motor 59 energized from a battery carried by the satellite transporter. A pallet carrying the load 7 to be transported (not shown in FIG. 8) is mounted on a platform 60. The platform 60 is mounted on the chassis 57 and is arranged to be raised and lowered relative to the chassis by means of screw jacks 61 driven by an electric motor 62. It will be seen that the chassis 57 lies below the level of the upper edges of the beams 9 on which the load is to be supported. Therefore, lowering the platform 60 to its lowest position by means of the screw jacks 61 causes the load to be deposited onto the beams 9, while raising the platform 60 underneath a stored load will transfer the load from the beams to the platform. The satellite transporter includes an extensible probe 70, (shown in FIG. 8 only) and a motor for extending and retracting the probe. The probe 70 is used to actuate a control circuit, as later described, for controlling the transporter.

OPERATION

The operation of the system will now be described. Both transporters carry control gear for initiating and controlling the sequential operating steps. As previously mentioned, the main transporter may be programmed to follow instructions stored in coded form, or may be operated by conventional switching means under the control of an operator. In the case of the satellite transporter, automatic control is necessary and one example of a suitable control system for the satellite transporter will be described.

MAIN TRANSPORTER-SEQUENCE OF OPERATIONS

Suppose initially that the main transporter is at its home position, the satellite transporter being within the elevator cage and carrying a load to be deposited in a selected storage cell. The main transporter 17, either under manual control or under the control of a computer from which it receives instructions, is driven horizontally along its aisle to the selected column of cells and is stopped at that location by a control system using a sensor 71 (FIG. 6) mounted on the chassis of the main transporter and a coded identification flag 72 (FIG. 6) on the rack structure. At the same time the elevator cage is raised and is stopped at approximately 6 inches above the level of the selected cell by a similar control system using a sensor 73 (FIG. 5) mounted on one of the upright members 11 of the cell structure in fixed relation to the cell entrance and a coded identification flag 74 (FIG. 5) mounted on the tower of the main transporter in a position at which it will be aligned with the sensor 73 when the cage is in the required position. For positioning the main transporter and the cage automatically in accordance with a program the sensing system used may suitably be the stacker control system manufactured by General Electric Company and sold under the trade mark "Code-A-Tab".

Next, the latches 52 are swung into position A and the track frame is extended towards the entrance to the sellected cell and is stopped within about three inches of its latched position; at the same time the latch supporting rails are extended from the track frame, the latch members 52 being then swung to position B and engaging the respective uprights 11 so as to center the track frame in relation to the entrance to the selected cell. The cage is now lowered by approximately 6½ inches to a point just below the true level of the cell entrance. This action causes the pivoted latches to rest on the transverse member at the entrance to the cell, thus lifting the front end of the track frame support.

The latch actuators now retract closing the pivoted latch members onto the respective latch abutments 53, and clamping the cage assembly to the cell entrance. When this action is completed, the pivoted latches will have moved approximately two inches and the track frame about three inches relative to the cell entrance so that the track frame is latched in position with its track rails abutting against the track rails within the storage cell.

When this action is complete, the satellite transporter is activated and will, in sequence, release its brakes, propel itself from the elevator cage along the tracks to the required position, deposit its load and return to the elevator cage, where it applies its brakes. A sensor on the elevator cage detects the return of the satellite transporter and initiates a reverse sequence of operations in which the track frame is disengaged from the cell entrance and returned to its initial position, the elevator cage being lowered and the main transporter returned to its home position where it is deactivated.

The sequence of operations is the same when a load has to be retrieved from a selected cell.

AUTOMATIC CONTROL OF SATELLITE TRANSPORTER

The following is a simplified description of the control and operation of the satellite transporter, reference being made to FIGS. 14 and 15 of the drawings, which illustrate control circuits carried by the satellite transporter. The modes of operation for storage and retrieval of items will be described separately.

In FIGS. 14 and 15, the components of the electrical control system carried by the satellite transporter are referenced as follows:

FIG. 14

| | |
|---|---|
| L 1 | |
| L 2 | |
| L 3 | Power Supply Lines |
| L 4 | |
| TR1 | Time Delay Relay |
| CS1 | Transporter Activating Control Switch |
| CR1, CR2 | Control Relays |
| LS1 | Transporter Out-Travel Limit Switch |
| LS2 | Transporter Platform Low Limit Switch |
| LS3 | Transporter In-Travel Limit Switch |
| LS4 | Transporter Platform Travel Upper Limit Switch |
| LS5 | Probe Tip Limit Switch |
| LS6 | Probe Extension Limit Switch |
| LS7 | Probe Retraction Limit Switch |
| BR1 | Brake Relay (brake on when all brake relays de-energized) |
| M1F1 | Transporter Forward Run Relay |
| M1R1 | Transporter Reverse Run Relay |
| M2R | Platform Raise Relay |
| M2L | Platform Lower Relay |
| M3E | Probe Extend Relay |
| M3R | Probe Retract Relay |

The suffixes a, b, c, etc. denote the contacts of the various relays and switches.

FIG. 15

| | |
|---|---|
| L 1 | |
| L 2 | Power Supply Lines |
| L 5 | |
| L 6 | |
| TR2 | Time Delay Relay |
| CS2 | Transporter Activating Control Switch |
| LS8 | Transporter Out-Travel Limit Switch |
| BR2 | Brake Relay (brake on when all brake relays de-energized) |
| M1F2 | Transporter Forward Run Relay |
| M1R2 | Transporter Reverse Run Relay |
| M2R | Platform Raise Relay |
| M2L | Platform Lower Relay |

Components CR1, CR2, LS1, LS2, LS3, LS4, LS6 and LS7 have been referred to in connection with FIG. 14.

1. Storage Mode

The transporter is initially at rest in the elevator cage with its brakes on.

A control switch CS1, which may be a magnetic, proximity type device, is actuated in response to a remotely controlled mechanism forming part of the elevator platform. Contact CS1b causes a relay CR1 to pick up but it cannot seal in because the contact LS3a is open. Contact CS1a also energizes a time delay relay TR1 whose contacts TR1a and TR1b immediately close and open again after timing out. This time delay permits the transporter to move away from its position, in turn causing contacts LS3a to close, thus sealing in the relay CR1. Contacts CR1b and CR1c provide power to lines L3 and L4 as long as a relay CR2 is de-energized and contacts CR2e and CR2f are closed.

Should the platform of the satellite transporter not be fully raised, contact LS4a will be closed. Then a relay M2R will be energized by contacts CR1d causing the platform drive motor to raise the transporter platform. When the platform is at its upper limit contact LS4a opens, de-energizing relay M2R.

Contact LS4b is now closed and since Probe Tip Limit Switch contact LS5a and Probe Extension Limit Switch contact LS6a are normally closed, Probe Extent Relay M3E will be energized, causing the probe drive motor to extend the probe until either LS5 or LS6 is actuated thus opening the circuit.

Either contact LS5b or LS6b will now be closed and Brake Relay BR1 will be energized through contact LS1a, which will normally be closed, thus releasing the brake of the satellite transporter. At the same instant contact BR1a will close thus energizing Transporter Forward Run Relay M1F1 through contact LS4c (closed) and contact LS1b. This will cause the transporter drive motor to run in a forward direction, propelling the transporter away from the elevator platform.

When the probe makes contact with any obstruction (a load in the cell or the end of the track), the transporter's forward motion will cause the probe to be retracted. A slipping clutch or spring loaded drive will prevent damage to the mechanism. The probe's extension at any instant will be used in a conventional speed control circuit (not shown in the diagram) to retard the transporter's forward motion down to crawl speed.

When the transporter arrives within stopping distance of its destination, Transporter Out-Travel Limit Switch LS1 will be actuated. Contacts LS1a and LS1b will open, de-energizing relays BR1 and M1F1, thus applying the brakes and disconnecting the drive motor. At the same time, contact LS1c will close, energizing the Platform Lower Relay M2L, causing the platform drive motor to lower the platform until the Platform Travel Low Limit Switch LS2 is actuated. Contact LS2b will then open, causing M2L to be de-energized. Coincidentally, contact LS1c will have energized the Probe Retract Relay M3R, causing the probe drive motor to retract fully the probe until switch LS7 is actuated, opening this circuit.

At the same time, contacts LS2a, LS2c and LS7b will have closed, energizing relays BR1 and M1R1, thus releasing the brake and causing the transporter drive motor to run in a reverse direction, propelling the transporter back to the elevator platform. When the transporter begins to enter the elevator cage, a limit switch (not shown in the diagram) will be actuated, causing the speed control circuit to retard the transporter's motion to crawl speed.

When the transporter arrives within stopping distance of its parked position on the elevator platform, Transporter In-Travel Limit Switch LS3 will be actuated. Contacts LS3b and LS3c will open, de-energizing relays BR1 and M1R1, thus applying the brakes and disconnecting the drive motor. At the same time contact LS3a will open, dropping out relay CR1 and de-energizing lines L3 and L4.

2. Retrieval Mode

Control switch CS2, which may be a magnetic, proximity type device, is actuated in response to a remotely controlled mechanism forming part of the elevator platform. Contact CS2b causes relay CR2 to pick up but it cannot seal in because the contact LS3f is open. CS2a also energizes time delay relay TR2 whose contacts immediately close and open again after timing out. This time delay permits the transporter to move away from its position, in turn causing LS3f contacts to close, thus sealing in relay CR2. Contacts CR2b and CR2c provide power to lines L5 and L6 as long as relay CR1 is de-energized and contacts CR1e and CR1f are closed.

Should the platform not be fully lowered contact LS2d will be closed; then Transporter Platform Lower Relay M2L will be energized by contacts CR2d causing the platform drive motor to lower the platform. When the platform is at its lower limit contact LS2d opens, deenergizing relay M2L.

Contact LS2e is now closed and Brake Relay BR2 is energized through contact LS8a, which will normally be closed, and contact LS7c (proving full retraction of probe), thus releasing the brake. At the same instant contact BR2a will close thus energizing Transporter Forward Run Relay M1F2 through contacts LS2f (closed) and contact LS8b. This will cause the transporter drive motor to run in a forward direction, propelling the transporter away from the elevator platform.

When the transporter platform begins to pass under the load to be retrieved, a limit switch (not shown in the diagram) will be actuated, causing the speed control circuit to retard the transporter's motion to crawl speed. When the transporter arrives within stopping distance of its destination, Transporter Out-Travel Limit Switch LS8 will be actuated. Contacts LS8a and LS8b will open, de-energizing relays BR2 and M1F2, thus applying the brakes and disconnecting the drive motor. At the same time, contact LS8c will close, energizing the Platform Raise Relay M2R, causing the platform drive motor to raise the platform until the Platform Travel Upper Limit Switch LS4 is actuated. Contact LS4e will then open, causing relay M2R to be de-energized.

At the same time, contacts LS4d and LS4f will close, energizing relays BR2 and M1R2 thus releasing the brake and causing the transporter drive motor to run in a reverse direction, propelling the transporter back to the elevator platform.

When the transporter beings to enter the elevator cage, a limit switch (not shown in the diagram) will be actuated, causing the speed control circuit to retard the transporter's motion to crawl speed. When the transporter arrives within stopping distance of its parked position on the elevator platform, Transporter In-Travel Limit Switch LS3 will be actuated. Contacts LS3d and LS3e will open, de-energizing relays BR2 and M1R2, thus applying the brakes and disconnecting the drive motor. At the same time contact LS3f will open, dropping out relay CR2 and de-energizing lines L5 and L6.

Power for the transporter operation may be from a battery carried on the vehicle (as previously mentioned) or by a retractable cord attached at one end to the transporter and at the other end to the elevator platform. In the latter case, the cable may also be used to transmit control signals to the transporter.

Figure 11:
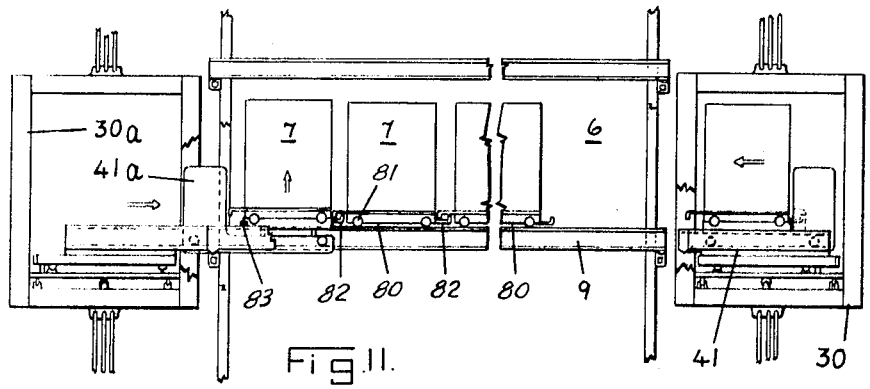
FIGS. 11, 12 and 13 are views of a detail of a modification.
Figure 12:
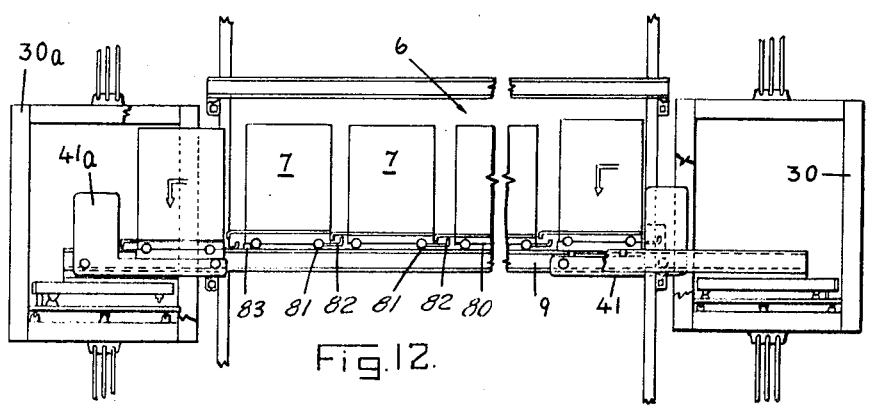
Figure 13:
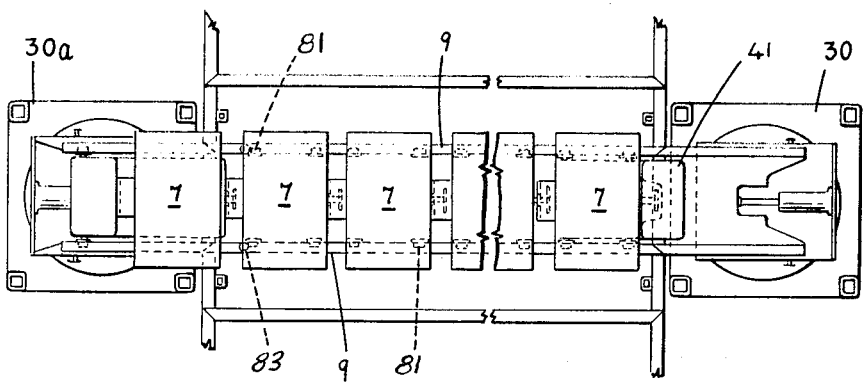

FIGS. 11, 12 and 13 illustrate a modification in which the items 7 are mounted on wheeled pallets 70 which are loaded into the selected cells and removed therefrom on a "first in, first out" basis. The pallets are equipped with flanged wheels 71 which are adapted to run on a track of the cell 6, the track being formed by the beams 9. The pallets 70 are also equipped with a coupling device 72 as illustrated. The coupling device 72 comprises a pair of coupling members, one of which consists of a bracket with a down-turned flange which extends for an appreciable part of the pallet width so that transverse location is not critical, and the other of which consists of a bracket with an upturned latch member. This latch member may be spring-loaded to avoid vertical interference during some of the operations described below.

The loaded pallet 70 is loaded into the cell 6 from the right-hand end as illustrated in the figures, the cage 30 first being positioned at the cell entrance and coupled thereto in the manner hereinbefore described. The satellite transporter 41, which initially carries the loaded pallet 70, enters the cell and lowers the pallet onto the cell track so that its coupling member engages the corresponding coupling member of the next pallet. Alternatively, the loaded pallet may be taken to the exit end of an empty cell where a spring-loaded or weight counterbalanced stop 73 serves to locate it.

The cell track is installed with a slight slope towards the exit end to ensure that the wheeled pallets, which have no brakes, will not tend to run back to the cell entrance.

To retrieve the first pallet in the cell, the cage 30a of a second main transporter is first positioned at the exit opening of the cell and latched thereto as previously described. A satellite transporter 41a enters the cell and the wheeled pallet to be removed is raised from the cell track by the raisable platform of the satellite transporter. At this stage a cam mechanism (not shown) on the side of the transporter operates to depress the spring-loaded stop 73 so that the transporter may move the pallet to the elevator cage 30a and at the same time draw the remaining pallets in the cell towards the exit end. When the satellite transporter passes a certain point the spring-loaded stop 73 is released so as to return to its normal position, and the next pallet is retained in the cell. The raisable platform of the satellite transporter 41a is lowered, thus disconnecting the coupling device 72 connecting the pallet to be removed to the train of pallets. Thereafter the cage 30a is disconnected from the cell exit and the load is transported to the selected destination.

In another modification not shown in the drawings, the satellite transporter is at all times connected to the elevator of the main transporter by means of a telescoping arm, the telescoping arm being extended or retracted as necessary by power means carried by the elevator, for the purpose of moving the satellite transporter into and out of the selected cell.

What I claim as my invention is:

1. In a storage system comprising an array of longitudinally extending storage cells having end access openings, said end access openings being arranged to provide at least one column of openings defining a vertical access face:

elevator means positioned adjacent to said column and extending substantially the full height of said access face;

the elevator means providing an elevator platform and means for positioning the platform in juxtaposition to a selected cell access opening;

a support frame mounted on the elevator platform, the support frame being adjustably mounted for pivotal movement about a horizontal axis and translation in a direction parallel to said horizontal axis;

a track support mounted on the support frame, the track support providing track means;

a satellite transporter mounted on said track means;

means for adjustably positioning the support frame to align the track support with the guide track of a selected storage cell;

means for extending the track means into cooperative engagement with said guide track; and automatic means for controlling movements of the satellite transporter to and from the track means.

2. A storage system according to claim 1, said automatic means comprising;

first sensor means responsive to the cage position for initiating operation of said bridging means;

second sensor means responsive to the operation of the bridging means for actuating the satellite transporter;

third sensor means responsive to the position of the satellite transporter in a storage cell for effecting transfer of a load to or from the satellite transporter;

fourth sensor means responsive to the transfer of the load for re-activating the satellite transporter for return movement from the cell to the cage platform; and fifth sensor means responsive to the return of the satellite transporter from the cell to the cage platform for retracting said bridging means.

3. A storage system according to claim 2, including further:

means responsive to the positioning of the main transporter in juxtaposition to a selected column of cell access openings for actuating said elevator means whereby to drive the elevator cage to the selected cell opening of the column.

4. A storage system according to claim 1, including pivoted latch means mounted on said track support;

latch abutment means mounted adjacent to the access opening of each said storage cell; and means for extending said latching means into latching engagement with the latch abutment means of a selected cell whereby to secure the elevator platform in an operable position with respect to the selected opening.

5. A storage system according to claim 4, wherein said pivoted latching means comprise a pair of latch members providing respective guide surfaces adapted to engage re-spective abutments at the selected cell opening for aligning the support frame with the cell opening.

6. A storage system according to claim 5, including a turntable mounted on the elevator platform, the support frame being adjustably mounted on the turntable, and drive means being provided for rotating the turntable.

7. A storage system for the high density storage of bulk items comprising:

a racking structure consisting of a honeycomb array of longitudinally extending storage cells having access openings which are disposed in rows and columns to define at least one vertical access face;

guide tracks extending along the storage cells from the access openings thereof;

means providing an access aisle extending transversely to the storage cells across the access face;

a main track extending along the access aisle;

a main transporter guided for movement along said main track;

means for positioning the main transporter in juxtaposition to a selected column of cell access openings;

elevator means mounted on the main transporter, the elevator means extending substantially the full height of said access face;

said elevator means including a cage having a cage platform, and means to position the cage in juxtaposition to a selected cell access opening of the selected column;

a support track mounted on the cage platform, the support track being adjustably mounted for pivotal movement about a horizontal axis and translation in a direction parallel to said horizontal axis;

means for adjustably positioning the support track to align the support track with the guide track of a selected storage cell;

a satellite transporter mounted on said support track, the satellite transporter being adapted to run on the guide tracks of the storage cells;

centering means for adjustably aligning the support track with the guide track of a selected storage cell;

extendible bridging means for extending the support track into cooperative engagement with the guide track of the selected storage cell; and automatic means for controlling the movements of the bridging means and of the satellite transporter to and from the cage.

8. A storage system according to claim 7, wherein the racking structure provides at least two storage sections, having opposing access faces, the access aisle extending between said access faces, and wherein the cage includes a turntable mounted on the cage platform, the support track being adjustably mounted on the turntable, and means for rotating the turntable to bring said support track into operative relation with either one of a pair of access openings of the two access faces.

9. A storage system according to claim 7, wherein the racking structure provides at least one storage section having a pair of access faces extending along a pair of respective access aisles, each of the storage cells extending between the access aisles and having an access opening at each end.

10. A storage system according to claim 7, in which the racking structure provides at least two further longitudinally extending cells having respective access openings at said access face, the system further comprising a first conveyor for conveying items to be stored along one of the further cells to the access opening thereof, and a second conveyor for conveying items to be removed from the access opening thereof.

11. A storage system according to claim 7, wherein the guide tracks are C-sectioned beams providing upper and lower horizontal flanges, the satellite transporter comprising a wheeled chassis adapted to run on the lower flanges of the C-sectioned beams and a load-carrying platform adapted to be raised and lowered with respect to the upper flanges for depositing a load thereon and for retrieving a load therefrom.

12. In a storage system comprising at least one storage unit consisting of a honeycomb array of longitudinally extending storage cells having guide tracks extending therealong, the storage cells having end access openings which are disposed in rows and columns to define first and second access faces of said storage unit:

first elevator means positioned adjacent to one said access face and extending substantially the full height thereof;

second elevator means positioned adjacent to the other said access face and extending substantially the full height thereof;

a plurality of wheeled pallets adapted to run on the guide track of a selected storage cell;

each said elevator means having
    (a) an elevator platform and means for positioning the platform in juxtaposition to an end access opening of the selected cell,
    (b) a support frame mounted on the elevator platform, the support frame being adjustably mounted for pivotal movement about a horizontal axis and translation in a direction parallel to said horizontal axis,
    (c) a track support mounted on the support frame, the track support providing track means, and
    (d) means for adjustably positioning the support frame to align the track support with the guide track of a selected storage cell, and
    (e) means for extending the track means into cooperative engagement with the guide track of the selected cell, said first elevator means including means for loading a wheeled pallet supported by the track means thereof into the selected cell from said one access face, and said second elevator means including means for retrieving a wheeled pallet supported by said guide track onto the track means of said second elevator means.

* * * * *